(12) United States Patent
Okoroafor et al.

(10) Patent No.: US 6,733,887 B2
(45) Date of Patent: May 11, 2004

(54) PHOTOCHROMIC COATED HIGH IMPACT RESISTANT ARTICLES

(75) Inventors: Michael O. Okoroafor, Roswell, GA (US); Robert A. Smith, Murrysville, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 49 days.

(21) Appl. No.: 10/231,501

(22) Filed: Aug. 30, 2002

(65) Prior Publication Data

US 2003/0044620 A1 Mar. 6, 2003

Related U.S. Application Data

(63) Continuation-in-part of application No. 09/499,054, filed on Feb. 4, 2000, now abandoned.

(51) Int. Cl.[7] ............................................. B32B 27/40
(52) U.S. Cl. ............... 428/423.3; 428/413; 428/423.1; 428/424.4; 428/425.3; 428/425.5
(58) Field of Search ............................ 428/413, 423.1, 428/423.3, 424.4, 425.3, 425.5; 359/241, 244, 589; 348/902

(56) References Cited

U.S. PATENT DOCUMENTS

| | | | |
|---|---|---|---|
| 3,169,945 A | 2/1965 | Hostettler et al. | 260/78.3 |
| 3,866,242 A | 2/1975 | Slagel | 2/2.5 |
| 3,971,892 A | 7/1976 | Schlichte | 179/15 |
| 4,166,043 A | 8/1979 | Uhlmann et al. | 252/300 |
| 4,367,170 A | 1/1983 | Uhlmann et al. | 252/586 |
| 4,556,605 A | 12/1985 | Mogami et al. | 428/331 |
| 4,719,296 A | 1/1988 | Irie et al. | 544/71 |
| 4,720,356 A | 1/1988 | Chu | 252/586 |
| 4,756,973 A | 7/1988 | Sakagami et al. | 428/412 |
| 4,764,430 A | 8/1988 | Blackburn et al. | 428/413 |
| 4,798,745 A | 1/1989 | Martz et al. | 427/407 |
| 4,798,746 A | 1/1989 | Claar et al. | 427/407 |
| 4,873,027 A | 10/1989 | Umemoto et al. | 562/83 |
| 4,889,413 A | 12/1989 | Ormsby et al. | 350/354 |
| 4,904,525 A | 2/1990 | Taniguchi et al. | 428/328 |
| 4,931,220 A | 6/1990 | Haynes et al. | 252/586 |
| 5,104,692 A | 4/1992 | Belmares | 427/164 |
| 5,158,922 A | 10/1992 | Hinney et al. | 502/175 |
| 5,166,345 A | 11/1992 | Akashi et al. | 544/71 |
| 5,196,485 A | 3/1993 | McMonigal et al. | 5262/327 |
| 5,236,958 A | 8/1993 | Miyashita | 518/121 |
| 5,239,012 A | 8/1993 | McEntire et al. | 525/327.7 |
| 5,252,742 A | 10/1993 | Miyashita | 548/121 |
| 5,256,452 A | 10/1993 | McMonigal | 427/407 |
| 5,359,035 A | 10/1994 | Habermann | 530/351 |
| 5,373,033 A | 12/1994 | Toh et al. | 522/96 |
| 5,391,327 A | 2/1995 | Ligas et al. | 252/586 |
| 5,470,813 A | 11/1995 | Le-Khac | 502/175 |
| 5,482,908 A | 1/1996 | Le-Khac | 502/156 |
| 5,488,119 A | 1/1996 | Fischer-Reimann et al. | 552/201 |
| 5,602,198 A | 2/1997 | Das et al. | 524/509 |
| 5,618,586 A | 4/1997 | Swarup et al. | 427/407 |
| 5,645,767 A | 7/1997 | Van Gemert | 252/586 |
| 5,646,230 A | 7/1997 | Pantone et al. | 528/64 |
| 5,658,501 A | 8/1997 | Kumar et al. | 252/586 |
| 5,663,244 A | 9/1997 | Barancyk et al. | 525/456 |
| 5,684,083 A | 11/1997 | Temple et al. | 524/541 |
| 5,814,410 A | 9/1998 | Singer et al. | 428/423 |
| 5,976,701 A | 11/1999 | Barancyk et al. | 428/423 |
| 6,025,026 A | 2/2000 | Smith et al. | 427/316 |
| 6,042,737 A | 3/2000 | Basil et al. | 216/37 |
| 6,060,001 A | 5/2000 | Welch et al. | 252/586 |
| 6,113,814 A | 9/2000 | Van Gemert et al. | 252/586 |
| 6,150,430 A | 11/2000 | Walters et al. | 522/79 |
| 6,153,126 A | 11/2000 | Kumar | 252/586 |
| 6,187,444 B1 | 2/2001 | Bowles, III et al. | 428/423.1 |
| 6,268,055 B1 | 7/2001 | Walters et al. | 428/413 |
| 6,296,785 B1 | 10/2001 | Nelson et al. | 252/586 |
| 6,348,604 B1 | 2/2002 | Nelson et al. | 549/389 |
| 6,353,102 B1 | 3/2002 | Kumar | 544/60 |
| 6,432,544 B1 | 8/2002 | Stewart et al. | 428/424.2 |

FOREIGN PATENT DOCUMENTS

| | | |
|---|---|---|
| EP | 0/146136 B1 | 7/1985 |
| GB | 1419985 | 1/1976 |
| JP | 62-226134 | 10/1987 |
| JP | 3-2864 | 1/1991 |
| JP | 3-35236 | 2/1991 |
| JP | 3-269507 | 12/1991 |
| JP | 5-28753 | 4/1993 |

OTHER PUBLICATIONS

Crano, John C. "Chromogenic Materials (Photochromic)", *Kirk–Othmer Encyclopedia of Chemical Technology*, 4th Ed., 1993, pp. 321–332.

Eisenbach, Claus D., "New Aspects of Photochromism In Bulk Polymers", Photographic Science & Engineering, 1979, pp. 183–190.

Hawley's Condensed Chemical Dictionary, 11th Ed., pp. 453–454.

Ullmann's Encyclopedia of Industrial Chemistry, 5th Ed., 1992, vol. A21, pp. 665.

*Techniques In Chemistry*, vol. III, "Photochromism", Chapter 3 Contents List, Glenn H. Brown, Ed., J. Wiley & Sons, Inc., NY, 1971.

*Primary Examiner*—D. S. Nakarani
(74) *Attorney, Agent, or Firm*—Frank P. Mallak

(57) ABSTRACT

Described is an article of a non-elastomeric poly(urea-urethane) substrate having free isocyanato surface groups and at least a partial coating of a photochromic polymeric coating on at least one surface of the substrate.

32 Claims, No Drawings

PHOTOCHROMIC COATED HIGH IMPACT RESISTANT ARTICLES

CROSS REFERENCE TO RELATED APPLICATIONS

This application is a continuation-in-part of application Ser. No. 09/499,054 filed Feb. 4, 2000 now abandoned.

BACKGROUND OF THE INVENTION

The present invention relates to photochromic polymerizates. More particularly, this invention relates to poly(urea-urethane) articles to which at least a partial coating of a photochromic polymeric coating has been applied.

Photochromic compounds exhibit a reversible change in color when exposed to light radiation involving ultraviolet rays, such as the ultraviolet radiation in sunlight or the light of a mercury lamp. Various classes of photochromic compounds have been synthesized and suggested for use in applications in which a sunlight-induced reversible color change or darkening is desired. The most widely described classes of photochromic compounds are oxazines, pyrans and fulgides.

The general mechanism responsible for the reversible change in color, i.e., a change in the absorption spectrum in the visible range of light (400–700 nm), exhibited by different types of photochromic compounds has been described and categorized. See John C. Crano, "Chromogenic Materials (Photochromic)", *Kirk-Othmer Encyclopedia of Chemical Technology*, Fourth Edition, 1993, pp. 321–332. The general mechanism for the most common classes of photochromic compounds, e.g., indolino spiropyrans and indolino spirooxazines, involves an electrocyclic mechanism. When exposed to activating radiation, these compounds transform from a colorless closed ring compound into a colored open ring species. In contrast, the colored form of fulgide photochromic compounds is produced by an electrocyclic mechanism involving the transformation of a colorless open ring form into a colored closed ring form.

In the aforedescribed electrocyclic mechanisms, the photochromic compounds require an environment in which they can reversibly transform. In solid polymer matrices, the rates at which the photochromic processes of activation, i.e., formation of color or darkening, and fading, i.e., the return to the original or colorless state, occur are believed to be dependent on the free volume in the polymer matrix. The free volume of the polymer matrix is dependent upon the flexibility of the chain segments of the polymer environment surrounding the photochromic compound, i.e., the local mobility or local viscosity of the chain segments comprising the matrix. See Claus D. Eisenbach, "New Aspects of Photochromism in Bulk Polymers", Photographic Science and Engineering, 1979, pp. 183–190. One of the main obstacles reported by Claus D. Eisenbach, for the larger commercial application of photochromic systems, is the slow rate of photochromic activation and fade in a solid polymer matrix.

In recent years, photochromic articles, particularly photochromic plastic materials for optical applications, have been the subject of considerable attention. In particular, photochromic ophthalmic plastic lenses have been investigated because of the weight advantage they offer, vis-à-vis, glass lenses. Moreover, photochromic transparencies for vehicles, such as cars, boats and airplanes, have been of interest because of the potential safety features, that such transparencies offer.

Polymers that are typically used to prepare impact resistant articles include thermoplastic polycarbonate, e.g., a resin derived from bisphenol A and phosgene, and acrylic polymers. Polycarbonates are considered superior to acrylics in impact resistance but have limited wearability since resistance to abrasion and chemicals is poor. The performance of photochromic compounds in such polycarbonates is also poor because the polycarbonate does not have sufficient internal free volume for photochromic compounds to function properly, i.e., to achieve an acceptable activated intensity and acceptable rates of activation and fade.

Photochromic plastic articles can be prepared without the need to incorporate the photochromic compound(s) into the plastic substrate. This is accomplished by applying photochromic polymeric coatings on the plastic substrate.

Although the use of photochromic compounds in polymeric coatings has been described in the literature, the use of photochromic compounds in polymeric coatings applied to substrates of poly(urea-urethane) resins having free isocyanate groups to produce articles has not been disclosed.

DETAILED DESCRIPTION OF THE INVENTION

The article of the present invention can exhibit one or more of the following properties: impact resistance, photochromic properties and good adhesion of coating to substrate without the use of an intermediate layer, coating or surface treatment to improve the adhesion of the applied coating.

Impact resistant ophthalmic substrates are defined herein as materials used to produce lenses that demonstrate a rating at least 20 times more impact resistant than the minimal level which is 0.15, specified by the Food and Drug Administration (FDA) in CFR 801.410. The increase in impact resistance of at least 20 fold is based on the impact energy of the lens divided by the minimal impact energy specified by the FDA. For example, an impact resistant lens would have an impact energy greater than 3.0 since 3.0/0.15 equals 20.

In one non-limiting embodiment, the substrate for the photochromic coatings is an non-elastomeric poly (urea-urethane) polymerizate comprising free isocyanate groups. By the term "non-elastomeric" is meant that an article of the present invention has an ultimate elongation at break of less than 200 percent. In comparison, the term "elastomer", according to *Hawley's Condensed Chemical Dictionary*, 11$^{th}$ Edition, refers to synthetic thermosetting high polymers having properties similar to those of vulcanized natural rubber, namely the ability to be stretched to at least twice their original length and to retract very rapidly to approximately their original length when released.

It is noted that, as used in this specification and the appended claims, the singular forms "a," "an," and "the" include plural referents unless expressly and unequivocally limited to one referent.

For the purposes of this specification, unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The phrase "at least a partial coating" means an amount of coating covering from a portion to the complete surface of the substrate. The phrase "an at least partially abrasion resistant coating" refers to a coating that demonstrates a Bayer Abrasion Resistance Index of from at least 1.3 to 10.0 in ASTM F-735 Standard Test Method for Abrasion Resistance of Transparent Plastics and Coatings Using the Oscillating Sand Method. The phrase "an at least partially antireflective surface" is a surface that has been treated to at least partially improve the antireflective nature of that surface by increasing the percent transmittance as compared to an untreated surface. The improvement in percent transmittance can range from 1 to 9 percent above the untreated surface. Put another way, the percent transmittance of the treated surface can range from a percentage greater than the untreated surface up to 99.9.

The phrase "demonstrating substantially no loss of adhesion from the substrate" includes the results 4B and 5B defined in ASTM D-3359 Test Method B—FIG. 1 Classification of Adhesion Test Results. The descriptions given for each are as follows: 4B—Small flakes of the coating are detached at intersections, less than 5 percent of the area is affected; and 5B—The edges of the cuts are completely smooth; none of the squares of the lattice is detached. In one non-limiting embodiment of the present invention, results of 4B and 5B are demonstrated. In another non-limiting embodiment, the result is 5B.

When referring to ASTM D-3359, the adhesion test results are those for testing that was done after the coated substrate was immersed in boiling deionized water for 1 hour. When referring to the High Impact Resistant Substrate Adhesion Test, the adhesion test results are those for testing that was done the next day after the coated substrate was immersed in boiling deionized water for 4 hours and immediately transferred and immersed in ice water overnight. Both tests are further described in Example 4 herein.

The disclosure of the related applications, patents and articles cited herein describing methods for preparing monomers, polymerizates, photochromic coatings and photochromic compounds, methods for adapting substrates and/or coatings to improve adhesion and processes for coating substrates are incorporated herein, in toto, by reference.

In the various non-limiting embodiments of the present invention, the exact nature of the film-forming coating composition is not critical other than it be photochromic in nature. Any photochromic polymeric coating can be used since the present invention relates to the photochromic articles resulting from the combination of the photochromic coating and the substrate described herein. In one non-limiting embodiment, the substrate has a surface containing reactive isocyanato groups. In another non-limiting embodiment, the substrate has a surface containing reactive isocyanato and amino groups. In a further non-limiting embodiment, such a substrate is impact resistant. The presence of the surface reactive groups on the substrate facilitates reactions with coatings having reactive groups such as hydroxyl, thiol, amino and isocyanate which allows adhesion of the coating to the substrate without having to pretreat the surface prior to coating.

In some non-limiting embodiments, it may be helpful to adapt the substrate by surface treatment methods known in the art to facilitate adhesion of the photochromic polymeric coating. In other non-limiting embodiments, it may be helpful to adapt the photochromic polymeric coating by including adhesion promoters known in the art to facilitate it to adhere to the substrate. In further non-limiting embodiments, it may be helpful to adapt both the substrate and the polymeric coating to facilitate adhesion of the coating to the article.

Methods for adapting the coating to improve the adhesion to the substrate include the addition of adhesion promoting agents to the coating. Non-limiting examples of such materials include trialkoxysilanes having an alkoxy substituent of 1 to 4 carbon atoms and polymerizable organofunctional silanes disclsoed in U.S. Pat. No. 6,150,430. These materials include γ-glycidoxypropyltrimethoxysilane, γ-aminopropyltrimethoxysilane, methacryloxypropyltrimethoxysilane, vinyltriacetoxysilane, 3,4-epoxycyclohexylethyltrimethoxysilane, aminoethyltrimethoxysilane or a mixture thereof. Adhesion promoting agents can be used in an amount that improves the adhesion of the coating to the substrate, i.e. an adhesion improving agent. An adhesion improving amount of adhesion promoting agents is an amount that demonstrates an improved adhesion rating as measured by ASTM D-3359-Standard Test Method for Measuring Adhesion by Tape Test-Method B as compared to the results for a coating without adhesion improving agents.

Methods for adapting the substrate to facilitate the adhesion of the photochromic polymeric coating include treatment techniques for cleaning the surface such as ultrasonic cleaning; washing with an aqueous mixture of organic solvent, e.g., a 50:50 mixture of isopropanol; water or ethanol; water; UV treatment; activated gas treatment, e.g., treatment with low temperature plasma or corona discharge; or chemical treatment such as hydroxylation, i.e., etching of the surface with an aqueous solution of alkali, e.g., sodium hydroxide or potassium hydroxide, that may also contain a fluorosurfactant. See U.S. Pat. No. 3,971,892, column 3, lines 13 to 25; U.S. Pat. No. 4,904,525, column 6, lines 10 to 48; and U.S. Pat. No. 5,104,692, column 13, lines 10 to 59, which describe surface treatments of polymeric organic materials. Further methods for adapting the substrate are disclosed in U.S. Pat. Nos. 6,025,026 and 6,150,430.

In non-limiting alternative embodiments of the present invention, the coating composition used to produce the photochromic coated articles of the present invention comprises compositions adapted to provide thermoplastic or thermosetting coatings that are described in the *Kirk-Othmer Encyclopedia of Chemical Technology*, Fourth Edition, Volume 6, pages 669 to 760. Such coatings may be transparent, translucent or opaque. In one contemplated embodiment the coating is one that upon at least partial curing forms a polymeric coating chosen from polyurethanes, aminoplast resins, silanes, poly(meth)acrylates, e.g., polyacrylates and polymethacrylates, polyanhydrides, polyacrylamides, and epoxy resins.

In another contemplated embodiment, the coating is one that forms an at least partially cured polymeric coating chosen from polyurethanes, aminoplast resins, silanes, polyanhydrides, polyacrylamides and epoxy resins. In a further contemplated embodiment, the polymeric coating is a polyurethane coating.

The photochromic polyurethane coatings that can be used to prepare the photochromic coated articles of the present invention are those that can be produced by the catalyzed or uncatalyzed reaction of an organic polyol component and an isocyanate component in the presence of photochromic compound(s). Materials and methods for the preparation of polyurethanes are described in *Ullmann's Encyclopedia of Industrial Chemistry*, Fifth Edition, 1992, Vol. A21, pages 665 to 716. Examples of organic polyols, isocyanates and other components that can be used to prepare the polyurethane coating are disclosed in U.S. Pat. Nos. 4,889,413 and 6,187,444B1; European Patent 0146136B1; and Japanese Patent Applications 3-269507 and 5-28753.

In one non-limiting embodiment, a photochromic aminoplast resin coating composition that can be used to produce the photochromic coated articles of the present invention can be prepared by combining a photochromic component with the reaction product of hydroxyl-functional component(s) having at least two functional groups or different functional component(s) having at least two different functional groups selected from hydroxyl, carbamate, urea or mixtures of such functional groups and an aminoplast resin, i.e., crosslinking agent as described in U.S. Pat. Nos. 4,756,973 and 6,432,544B1; and Japanese Patent Applications 62-226134; 3-2864 and 3-35236. Examples of functional components, aminoplast resins and other components that can be used to prepare the aminoplast resin coatings are disclosed in U.S. Pat. Nos. 5,602,198, 5,663,244, 5,814,410 and 5,976,701.

Photochromic silane coating compositions contemplated for use in preparing the photochromic coated articles of the present invention can be prepared by combining the photochromic compound(s) disclosed herein with hydrolyzed silane monomer(s) such as glycidoxypropyltrimethoxysilane, vinyltrimethoxysilane, methacryloxypropyltrimethoxysilane, tetramethoxysilane, tetraethoxysilane and methyltrimethoxysilane as described in U.S. Pat. No. 4,556,605.

Photochromic poly(meth)acrylate coating compositions contemplated for use in preparing the photochromic coated articles of the present invention can be prepared by combining photochromic compound(s) with monomer(s) chosen from pentaerythritol di-, tri- and tetra-acrylates, pentaerythritol di-, tri- and tetra-methacrylates, butanediol di(meth)acrylate, hexanediol di(meth)acrylate, nonanediol di(meth)acrylate, diethylene glycol dimethacrylate, triethylene glycol dimethacrylate, poly(oxyalkylene dimethacrylates), e.g., polyethylene glycol (600) dimethacrylate, ethoxylated bisphenol A dimethacrylate monomers, ethylene glycol bismethacrylate monomers, poly(ethylene glycol) bis methacrylate monomers, polyhydric alcohol polyacrylate monomers, such as trimethylol propane trimethacrylate, alkoxylated polyhydric alcohol polyacrylate monomers, such as ethoxylated trimethylol propane triacrylate monomers, urethane acrylate monomers, such as those described in U.S. Pat. No. 5,373,033, polyfunctional, e.g., mono-, di- or multi-functional, acrylate and/or methacrylate monomers, $C_1$–$C_{12}$ alkyl methacrylates, such as methyl methacrylate, alkoxylated phenol methacrylates; polyol [(meth)acryloyl terminated carbonate]monomer, e.g., 2,5,8,10,13-pentaoxahexadec-15-enoic acid, 15-methyl-9,14-dioxo-2[(2-methyl-1-oxo-2-propenyl)oxy]ethyl ester; acrylated oligomers of epoxies, urethanes, acrylics and polyesters or a mixture thereof.

In one non-limiting embodiment, a polyanhydride photochromic coating composition that can be used to prepare the photochromic coated articles of the present invention can be prepared by the reaction of hydroxyl-functional component (s) having at least two hydroxyl groups and polymeric anhydride-functional component(s) having at least two cyclic carboxylic acid anhydride groups in a composition including at least one organic photochromic component as described in U.S. Pat. No. 6,432,544B1. Non-limiting examples of hydroxyl-functional components, anhydride-functional component(s) and other components that can be used to prepare the polyanhydride photochromic coatings are disclosed in U.S. Pat. Nos. 4,798,745, 4,798,746 and 5,239,012.

Photochromic polyacrylamide coating compositions contemplated for use in preparing the photochromic coated articles of the present invention can be prepared by combining a photochromic component with the free radical initiated reaction product of a polymerizable ethylenically unsaturated composition comprising: a) from 25 to 80% by weight of an N-alkoxymethyl(meth)acrylamide; and b) from 20 to 75% by weight of at least one other copolymerizable ethylenically unsaturated monomer, said weight percentages being based on the total weight of the polymerizable ethylenically unsaturated monomers as described in U.S. Pat. No. 6,060,001. Methods for preparing N-alkoxymethyl(meth) acrylamide functional polymer are described in U.S. Pat. No. 5,618,586. The term N-alkoxymethyl(meth)acrylamide means either N-alkoxymethylacrylamide or N-alkoxymethylmethacrylamide.

The copolymerizable ethylenically unsaturated monomers without alkoxyacrylamide functionality used in the polymerizable composition include vinyl aromatic monomers such as styrene, alpha-methyl styrene, and tertiary butyl styrene; (meth)acrylamidobutyraldehyde dialkyl acetal monomers such as acrylamidobutyraldehyde diethyl acetal (ABDA), methacrylamidobutyraldehyde diethyl acetal (MABDA), and the like; vinyl aliphatic monomers such as ethylene, propylene, and 1,3-butadiene; poly (alkyleneglycol)(meth)acrylate, e.g., methoxypolyethylene glycol monomethacrylate; epoxy-functional monomers, e.g., glycidyl (meth)acrylate, and glycidoxypropyl (meth) acrylate; and alkyl esters of acrylic and methacrylic acid having from 1 to 17 carbon atoms in the alkyl group, including methyl (meth)acrylate, ethyl (meth)acrylate, butyl (meth)acrylate, isodecyl (meth)acrylate, cyclohexyl (meth) acrylate, 2-ethylhexyl (meth)acrylate, isobornyl (meth) acrylate and lauryl (meth)acrylate.

In one non-limiting embodiment, the photochromic epoxy resin coating compositions that can be used to prepare the photochromic coated articles of the present invention can be prepared by combining photochromic compound(s), epoxy resins or polyepoxides and curing agents as disclosed in U.S. Pat. Nos. 4,756,973 and 6,268,055B1; and United Kingdom Patent No. 1,419,985. Among the polyepoxides which can be used are epoxy-containing acrylic polymers, epoxy condensation polymers such as polyglycidyl ethers of alcohols and phenols and polyglycidyl esters of polycarboxylic acids, certain polyepoxide monomers and oligomers and mixtures of such polyepoxides. Non-limiting examples of these materials are described in U.S. Pat. No. 5,256,452 column 3, line 28 to column 4, line 46.

In one non-limiting embodiment, curing agents for the photochromic epoxy resin coating composition of the present invention can be polyacid curing agents having at least two acid groups per molecule. Among the polyacid curing agents which can be used are carboxylic acid group-containing polymers such as acrylic polymers, polyesters, and polyurethanes; oligomers such as ester group-containing oligomers and monomers. Examples of such curing agents and other epoxy resin coating composition components are disclosed in U.S. Pat. Nos 4,764,430 and 5,196,485.

The foregoing photochromic polymer-forming coating compositions, used to prepare the photochromic coated articles of the present invention, can further comprise additional conventional ingredients that impart desired physical characteristics to the coating composition or the resultant cured layer; that are required for the process used to apply and cure the coating composition to the substrate; and/or that enhance the cured coating layer made therefrom. Such non-limiting additional ingredients include solvents, rheology control agents, plasticizers, leveling agents, e.g., surfactants, catalysts, e.g., polymerization initiators, e.g., thermal and photopolymerization initiators, cure-inhibiting agents, and free radical scavengers.

Organic photochromic compounds contemplated for use in the polymer-forming coating compositions of the present invention are organic photochromic compounds having at least one activated absorption maxima within the range of between about 400 and 700 nanometers, or substances containing the same. The photochromic compounds can each be used alone or in combination with one or more other organic photochromic materials.

The organic photochromic materials can include chromenes, e.g., naphthopyrans, benzopyrans, indenonaphthopyrans and phenanthropyrans; spiropyrans, e.g., spiro(benzindoline)naphthopyrans, spiro(indoline)benzopyrans, spiro(indoline)naphthopyrans, spiro(indoline)quinopyrans and spiro(indoline)pyrans; oxazines, e.g., spiro(indoline) naphthoxazines, spiro(indoline)pyridobenzoxazines, spiro(benzindoline)pyridobenzoxazines, spiro(benzindoline) naphthoxazines and spiro(indoline)benzoxazines; mercury dithizonates, fulgides, fulgimides and mixtures of such photochromic compounds. Such photochromic compounds and complementary photochromic compounds are described in U.S. Pat. Nos. 5,645,767, 5,658,501, 6,153,126, 6,296,785, 6,348,604 and 6,353,102. Spiro(indoline)pyrans are also described in the text, *Techniques in Chemistry*, Volume III, "Photochromism", Chapter 3, Glenn H. Brown, Editor, John Wiley and Sons, Inc., New York, 1971.

In one non-limiting embodiment, the organic photochromic materials can also include polymerizable photochromic compounds, such as those disclosed in U.S. Pat. Nos. 4,719,296; 5,166,345; 5,236,958; 5,252,742; 5,359,035; 5,488,119 and 6,113,814.

Other photochromic substances contemplated are organometal dithiozonates, i.e., (arylazo)-thioformic arylhydrazidates, e.g., mercury dithizonates which are described in, for example, U.S. Pat. No. 3,361,706; and fulgides and fulgimides, e.g., the 3-furyl and 3-thienyl fulgides and fulgimides, which are described in U.S. Pat. No. 4,931,220 at column 20, line 5 through column 21, line 38.

In addition, it is contemplated that a form of organic photochromic substance resistant to the effects of a polymerization initiator can also be added to the coating composition. Such organic photochromic substances include photochromic compounds encapsulated in metal oxides, the latter of which are described in U.S. Pat. Nos 4,166,043 and 4,367,170.

The photochromic articles of the present invention can contain one photochromic compound or a mixture of photochromic compounds, as desired. Mixtures of photochromic compounds can be used to attain certain activated colors such as a near neutral gray or brown or a fashionable color, e.g., pink. Further discussion of neutral colors and ways to describe colors can be found in U.S. Pat. No. 5,645,767, column 12, line 66 to column 13, line 19.

The organic photochromic compounds can be incorporated into the polymer-forming coating composition by various methods described in the art. Such methods include adding the photochromic compounds to one or more of the materials used to form the coating composition. In such methods, the photochromic compounds can be dissolved and/or dispersed in an aqueous or organic solvent prior to being incorporated into one or more of the components of the coating composition. Alternatively, the photochromic compounds can be incorporated into the cured coating by imbibition, permeation or other transfer methods as known by those skilled in the art.

The amount of the photochromic substances described herein to be used in the coatings of the present invention is an amount sufficient to produce a photochromic effect discernible to the naked eye upon activation. Generally such amount can be described as a photochromic amount. The photochromic compounds are used in photochromic amounts and in a ratio (when mixtures are used) such that a coating composition to which the compound(s) is applied or in which it is incorporated exhibits a desired resultant color when activated with unfiltered sunlight.

In one non-limiting embodiment, the amount of photochromic material incorporated into the various embodiments of the invention can vary widely. In alternate non-limiting embodiments, the amount ranges from 0.1 to 40 weight percent based on the weight of the liquid coating composition, e.g., the concentration of photochromic material ranges from 1.0 to 30 weight percent, from 3 to 20 weight percent, from 5 to 15 weight percent or from 7 to 14 weight percent, based on the weight of the liquid coating composition. The amount of photochromic substance in the coating can range between any combination of these values, inclusive of the recited range.

Compatible (chemically and color-wise) tints, e.g., dyes, can be added to the coating composition, applied to the coated article or applied to the substrate prior to coating to achieve a more aesthetic result, for medical reasons, or for reasons of fashion. The particular material selected will vary and depend on the aforesaid need and result to be achieved. In one embodiment, the material can be selected to complement the color resulting from the activated photochromic substances, e.g., to achieve a more neutral color or absorb a particular wavelength of incident light. In another embodiment, the dye can be selected to provide a desired hue to the substrate and/or coated article when the photochromic substances is in an unactivated state.

Adjuvant materials can also be incorporated into the coating composition with the photochromic material used, prior to, simultaneously with or subsequent to application or incorporation of the photochromic material in the coating composition or cured coating. For example, ultraviolet light absorbers can be admixed with photochromic substances before their addition to the coating composition or such absorbers can be superposed, e.g., superimposed, as an at least partial coating between the photochromic coating and the incident light. In other non-limiting embodiments, further stabilizers can be admixed with the photochromic substances prior to their addition to the coating composition to improve the light fatigue resistance of the photochromic substances. Stabilizers, such as hindered amine light stabilizers (HALS), asymmetric diaryloxalamide (oxanilide) compounds and singlet oxygen quenchers, e.g., a nickel ion complex with an organic ligand, or mixtures of stabilizers are contemplated. They can be used alone or in combination. Such stabilizers are described in U.S. Pat. Nos. 4,720,356 and 5,391,327, respectively.

The aforedescribed coating compositions are applied to substrates prepared from poly(urea-urethane) resin compositions described herein. It is contemplated that the coating composition comprises a photochromic amount of organic photochromic compound. As used herein, a photochromic amount is that amount sufficient to produce a coating that exhibits a photochromic effect discernible to the naked eye when the cured coating is exposed to UV radiation. The thickness of the cured coating can vary widely. In one non-limiting embodiment, the cured coating can have a thickness of from 1 to 10,000 microns. In one contemplated embodiment, the coating thickness can be from 5 to 1,000 microns. In another contemplated embodiment, the coating thickness can be from 10 to 400 microns, e.g., 30 microns. The thickness of the applied coating can range between any combination of these values, inclusive of the recited values, e.g., from 1.1 to 9,999.9 microns.

The coating composition of the present invention can be applied by any of the methods used in coating technology such as, for example, spray coating, spin coating, spread coating, curtain coating, dip coating, casting or roll-coating. In one contemplated embodiment, the coating composition is applied by spin coating, curtain coating, dip coating, spray coating methods, the spin and spray coating process disclosed in U.S. Pat. No. 6,352,747B1 or by methods used in preparing overlays. Such methods for producing overlays are disclosed in U.S. Pat. No. 4,873,027.

Following application of the coating composition to the treated surface of the substrate, the coating is generally cured at least partially. The temperature used to at least partially cure the coating can vary widely depending on the components selected for the coating composition of the present invention. In one contemplated embodiment, the coating can be cured at temperatures ranging from 22° C. to 150° C. If heating is required to obtain a cured coating, temperatures of between 80° C. and a temperature above which the substrate is damaged due to heating, e.g., 80° C. to 140° C., can be used. While a range of temperatures has been described for curing the coated substrate, it will be recognized by persons skilled in the art that temperatures other than those disclosed herein can be used. Additional methods for curing the photochromic coating composition include irradiating the coating with infrared, ultraviolet, visible, microwave, or electron radiation. This may be followed by a heating step.

In one contemplated embodiment, the resulting cured coating meets commercially acceptable "cosmetic" standards for optical coatings. Examples of cosmetic defects of coated lens include an orange peel-like appearance, pits, spots, inclusions, cracks and crazing of the coating. In another contemplated embodiment, the coatings prepared using the photochromic coating compositions of the present invention are substantially free of cosmetic defects. By substantially free of cosmetic defects is meant that although one or more of these defects are present, the defects are not present to the degree to detract from the aesthetic appearance of the article.

In one non-limiting embodiment, the poly (urea-urethane) substrate comprises free isocyanato groups, further non-limiting embodiments further comprises free amino groups, in a still further the non-limiting embodiment, the substrate comprises the reaction product of reactants comprising (a) at least one polyol, e.g., diol; (b) at least one polyisocyanate having at least two isocyanato groups; (c) at least one polyamine having at least two amino groups, each amino group being independently selected from primary amino and secondary amino; and optionally, (d) at least one polyol having at least three hydroxyl groups; wherein the number of isocyanato groups of the isocyanate reactants is greater than the number of hydroxyl groups of the polyol reactants.

One polyol, e.g., diol, or more than one diol can be employed in forming the poly(urea-urethane). The polyols which can be used are numerous and widely varied. In one contemplated embodiment, they can be substantially free from ethylenic or acetylenic unsaturation. The polyols which are used individually or in combination are aliphatic, alicyclic, aromatic, aliphatic-alicyclic, aliphatic-aromatic, alicyclic-aromatic, or aliphatic-alicyclic-aromatic in nature. The polyols are usually simple diols, e.g., diols having a formula molecular weight less than 500 grams per mole, ester diols, polyester diols, ether diols, polyether diols, or mixtures of such diols. Although other kinds of diols can be employed as desired. The aliphatic groups of the diols can be straight or branched. Non-limiting examples of such polyols are disclosed in U.S. Pat. No. 5,684,083.

In one non-limiting embodiment, the diols which are employed, have a formula molecular weight ranging from at least 62, e.g., from 100, 200 or from at least 300. The weight average molecular weight, as determined by gel permeation chromatography using polyethylene glycol as a standard, of the diol is usually not more than 17,500, e.g., not more than 10,000, 8,000 or 2,000. For example, the molecular weight of the diol may range from 400 to 1,500. The molecular weight of the diol may range between any combination of these values, inclusive of the recited values.

Non-limiting examples of such diols include: 1,2-ethanediol, 1,2-propanediol, 1,3-propanediol, 1,3-butanediol, 1,4-butanediol, 1,5-pentanediol, 2,2-dimethylpropane-1,3-diol, 2-butyl-2-ethylpropane-1,3-diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, and 1,4-cyclohexanediethanol.

Other examples include the polyalkylene glycols such as: diethylene glycol, triethylene glycol, tetraethylene glycol, higher poly(ethylene glycol), such as those having number average molecular weights, as determined by gel permeation chromatography using polyethylene glycol as a standard, of from 220 to 2000, dipropylene glycol, tripropylene glycol, and higher poly(propylene glycol) such as those having number average molecular weights of from 234 to 2000. The number average molecular weight of the diol can range between any combination of these values, inclusive of the recited values.

Yet other examples of such diols include 4,4'-(1-methylethylidene)bis[cyclohexanol], 2,2'-methylenebis[phenol], 4,4'-methylenebis[phenol], 4,4'-(phenylmethylene)bis[phenol], 4,4'-(diphenylmethylene)bis[phenol], 4,4'-(1,2-ethanediyl)bis[phenol], 4,4'-(1,2-cyclohexanediyl)bis[phenol], 4,4'-(1,3-cyclohexanediyl)bis[phenol], 4,4'-(1,4-cyclohexanediyl)bis[phenol], 4,4'-ethylidenebis[phenol], 4,4'-(1-phenylethylidene)bis[phenol], 4,4'-propylidenebis[phenol], 4,4'-cyclohexylidenebis[phenol], 4,4'-(1-methylethylidene)bis[phenol], 4,4'-(1-methylpropylidene)bis[phenol], 4,4'-(1-ethylpropylidene)bis[phenol], 4,4'-cyclohexylidenebis[phenol], 4,4'-(2,4,8,10-tetraoxaspiro[5.5]undecane-3,9-diyldi-2,1-ethanediyl)bis[phenol], 1,2-benzenedimethanol, 1,3-benzenedimethanol, 1,4-benzenedimethanol, 4,4'-[1,3-phenylenebis(1-methylethylidene)]bis[phenol], 4,4'-[1,4-phenylenebis(1-methylethylidene)]bis[phenol], phenolphthalein, 4,4'-(1-methylidene)bis[2-methylphenol], 4,4'-(1-methylethylidene)bis[2-(1-methylethyl)phenol], 2,2'-methylenebis[4-methyl-6-(1-methylethyl)phenol], Ester diols and polyester diols constitute additional classes of diols which can be used. The polyester diols which can be employed usually have a weight average molecular weight, as determined by gel chromatography using polyethylene glycol as a standard, in the range of from 500 to 1200. Often the polyester diols have a weight average molecular weight in the range of from 500 to 1000. In one contemplated embodiment, the weight average molecular weight is in the range of from 600 to 900. The weight average molecular weight of the diol can range between any combination of these values, inclusive of the recited values.

One type of polyester diol that can be used is that prepared by the reaction of a diol and a dicarboxylic acid. While any of the diols described above can be used, the simple diols such as 1,6-hexanediol or 1,10-decanediol are contemplated. Exemplary dicarboxylic acids include: malonic acid, succinic acid, glutaric acid, adipic acid, pimelic acid, suberic acid, azelaic acid, sebacic acid, phthalic acid, isophthalic acid, and terephthalic acid. Anhydrides, where they exist can be used in lieu of the corresponding dicarboxylic acids.

In one non-limiting embodiment, another type of polyester diol that can be used is poly(caprolactone diol), which is the reaction product of one or more diols and ε-caprolactone. While any of the diols described above can be used in that reaction, the simple diols such as 1,2-ethanediol, 1,4-butanediol, 2,2-dimethylpropane-1,3-diol, 1,6-hexanediol, 1,10-decanediol, 1,12-dodecanediol and diethylene glycol are most often used. U.S. Pat. No. No. 3,169,945 describes many such diols and their reaction with ε-caprolactone.

Polyether diols are commonly made by polymerizing one or more cyclic ethers such as epoxides (e.g., ethylene oxide, propylene oxide), oxetanes, oxolanes (e.g., tetrahydrofuran), or the like, in the presence of water or a diol starter. The polyether diols are made using any suitable catalyst, including, for example, potassium hydroxide, boron trifluoride, or a double metal cyanide. Double metal cyanide catalysts are preferred because they easily give polyether diols with exceptionally low unsaturation or monol content. The diols can be homopolymers (e.g., poly(oxypropylene) diols), random copolymers of two or more cyclic ethers (e.g., a random copolymer of propylene oxide and ethylene oxide), block copolymers (e.g., a poly(oxypropylene) core with poly(oxyethylene) caps, "tipped" copolymers (e.g., a poly(oxypropylene-co-oxyethylene core having one oxypropylene to oxyethylene ratio, which core is tipped with poly(oxypropylene-co-oxyethylene) having a different oxypropylene to oxyethylene ratio.

Usually, but not necessarily, the polyether diol has a weight average molecular weight, as determined by gel permeation chromatography using polyethylene as a standard, in the range of from 1500 to 17,500. Often the weight average molecular weight is in the range of from 2000 to 10,000. In one contemplated embodiment, the weight average molecular weight is in the range of from 2000 to 8000. The weight average molecular weight of the diol can range between any combination of these values, inclusive of the recited values.

The actual hydroxyl functionality of polyether diols usually varies and often depends on the nature of the catalyst used to make the polyether diol. While a polyether diol made by conventional KOH catalysis typically has an actual hydroxyl functionality of only about 1.6 or 1.7, one made using double metal cyanide catalyst can have an actual hydroxyl functionality very close to 2.

In one contemplated embodiment, polyether diols for use in the present invention have low unsaturations. In particular, polyether diols having unsaturations less than 0.02 meq/g, e.g., less than 0.01 meq/g. or less than 0.007 meq/g. can be used.

These polyether diols can be made by various known methods, including use of double metal cyanide catalysts, as described in U.S. Pat. Nos. 5,158,922; 5,470,813; and 5,482,908.

In one non-limiting embodiment, one polyisocyanate having at least two isocyanato groups or a mixture of more than one such polyisocyanate may be used in forming the poly (urea-urethane). In most instances, the polyisocyanate has two isocyanato groups. When a mixture of polyisocyanates is employed and when some have more than two isocyanato groups, the mixture usually (but not necessarily) contains one or more polyisocyanates having two isocyanato groups. In most instances the average isocyanato functionality is in the range of from 2 to 4 isocyanato groups per molecule. Frequently the average isocyanato functionality is in the range of from 2 to 3 isocyanato groups per molecule. In many instances the average isocyanato functionality is in the range of from 2 to 2.5 isocyanato groups per molecule. In one contemplated embodiment, the average isocyanato functionality is 2 isocyanato groups per molecule.

The polyisocyanates, which can be used, are numerous and widely varied. Non-limiting examples of types and classes of polyisocyanates include aliphatic polyisocyanates, alicyclic polyisocyanates where one or more isocyanato groups are attached directly to the ring, alicyclic polyisocyanates where one or more isocyanato groups are not attached directly to the ring, aromatic polyisocyanates where one or more isocyanato groups are attached directly to the ring, aromatic polyisocyanates where one or more isocyanato groups are not attached directly to the ring, hybrids of any of the foregoing and mixtures of such polyisocyanates.

Non-limiting examples of such polyisocyanates include, but are not limited to: 1,2-diisocyanatoethane, 1,2-diisocyanatopropane, 1,3-diisocyanatopropane, 1,2-diisocyanato-2-methylpropane, 1,2-diisocyanatobutane, 1,3-diisocyanatobutane, 1,4-diisocyanatobutane, 1,5-diisocyanatopentane, 1,6-diisocyanatohexane, 1,7-diisocyanatoheptane, 1,8-diisocyanatooctane, 1,9-diisocyanatononane, 1,10-diisocyanatodecane, 1,5-diisocyanato-2,2-dimethylpentane, ethylidine diisocyanate, butylidene diisocyanate, bis(2-isocyanatoethyl) ether, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, bis(4-isocyanatocyclohexyl) ether, 1-(isocyanatomethyl)-5-isocyanato-1,3,3-trimethylcyclohexane, 1-(isocyanatomethyl)-1-(3-isocyanatopropyl)cyclohexane, bis(2-isocyanatocyclohexyl) methane, bis(3-isocyanatocyclohexyl)methane, bis(4-isocyanatocyclohexyl)methane, 1,2-bis(2-isocyanatocyclohexyl)ethane, 1,2-bis(3-isocyanatocyclohexyl)ethane, 1,2-bis(4-isocyanatocyclohexyl)ethane, 2,2-bis(4-isocyanatocyclohexyl)propane, 2,3-bis(8-isocyanatooctyl)-4-octyl-5-hexylcyclohexene, 1,2-diisocyanatobenzene, 1,3-diisocyanatobenzene, 1,4-diisocyanatobenzene, 1,4-diisocyanato-2-ethylbenzene, 1,3-diisocyanato-5-(1-methylethyl)benzene, 1,2-dimethyl-3,5-diisocyanatobenzene, 1,3-bis(1-isocyanato-1-methylethyl) benzene, 1,4-bis(1-isocyanato-1-methylethyl)benzene, bis (2-isocyanatophenyl)methane, bis(3-isocyanatophenyl) methane, bis(4-isocyanatophenyl)methane, 1,2-bis(2-isocyanatophenyl)ethane, 1,2-bis(3-isocyanatophenyl) ethane, 1,2-bis(4-isocyanatophenyl)ethane, 4,4'-diisocyanatobiphenyl, 1,4-diisocyanatonaphthalene, 1,5-diisocyanatonaphthalene, 1,5-bis(isocyanatomethyl) naphthalene, 2,4-diisocyanatotoluene, 2,6- diisocyanatotoluene, 1,2-bis(isocyanatomethyl)benzene, 1,3-bis(isocyanatomethyl)benzene, 1,4-bis(isocyanatomethyl)benzene, 1,2-bis(2-isocyanatoethyl)benzene, 1,3-bis(2-isocyanatoethyl)benzene, 1,4-bis(2-isocyanatoethyl)benzene, 1,2-bis(1-isocyanato-1-methylethyl)benzene, 1,3-bis(1-isocyanato-1-methylethyl)benzene, 1,4-bis(1-isocyanato-1-methylethyl)benzene, 1,2-bis(4-isocyanatobutyl)benzene, 1,3-bis(4-isocyanatobutyl)benzene, 1,4-bis(4-isocyanatobutyl)benzene, bis(4-isocyanatophenyl) ether, bis(4-isocyanatomethylphenyl) ether, 3,3'-diisocyanatobiphenyl, 4,4'-diisocyanatobiphenyl, 4,4'-diisocyanato-2,2'-dimethylbiphenyl, 4,4'-diisocyanato-3,3'-dimethylbiphenyl, 4,4'-diisocyanato-2,2'-dimethoxybiphenyl, 4,4'-diisocyanato-3,3'-dimethoxybiphenyl, 2,5-bis(isocyanatomethyl)furan, tris(4-isocyanatophenyl)methane, tris(4-isocyanatocyclohexyl)methane, 1,3,5-triisocyanatobenzene, 2,4,6-triisocyanatotoluene, 2,4,6-triisocyanatomesitylene, 1,3,5-tris(6-isocyanatohexyl)biuret, 2,4,6-triisocyanato-1,3,5-triazine, 2-isocyanatomethyl-2-(3-isocyanatopropyl)-5-isocyanatomethyl-bicyclo[2.2.1]heptane, 2-isocyanatomethyl-3-(3-isocyanatopropyl)-5-isocyanatomethyl-bicyclo[2.2.1]heptane, 2-isocyanatomethyl-2-(3-isocyanatopropyl)-6-isocyanatomethyl-bicyclo[2.2.1]heptane, 2-isocyanatomethyl-3-(3-isocyanatopropyl)-6-isocyanatomethyl-bicyclo[2.2.1]heptane, 2-isocyanatomethyl-2-(3-isocyanatopropyl)-5-(2-isocyanatoethyl)bicyclo[2.2.1]heptane, 2-isocyanatomethyl-3-(3-isocyanatopropyl)-6-(2-isocyanatoethyl)bicyclo[2.2.1]heptane, 2-isocyanatomethyl-2-(3-isocyanatopropyl)-6-(2-isocyanatoethyl)bicyclo[2.2.1]heptane, bis(2,5-diisocyanato-4-methylcyclohexyl)methane, bis(2,5-diisocyanato-4-methylphenyl)methane, polymeric polyisocyanates such as dimers and trimers, and prepolymers which are derived from a polyol, including a hydrocarbon polyol, a polyether polyol, a polyester polyol or mixtures of such polyols. An example is an adduct (approximately 3:1, molar) of 1-isocyanatomethyl-5-isocyanato-1,3,3-trimethylcyclohexane and 2-ethyl-2-(hydroxymethyl)-1,3-propanediol.

In one contemplated embodiment, the polyisocyanate used is bis(4-isocyanatocyclohexyl)methane. The trans-trans isomer, the cis-trans isomer or the cis-cis isomer can be used either alone or in combination with either or both of the other isomers. In most instances the trans-trans isomer constitutes from 20 to 100. In one contemplated embodiment, the bis(4-isocyanatocyclohexyl)methane contains at least about 50 percent of the trans-trans isomer and no more than 20 percent of the cis-cis isomer.

The polyamine has at least two amino groups, each amino group being independently selected from primary amino (—NH$_2$) or secondary amino (—NH—). In one contemplated embodiment, all of the amino groups are primary amino. The polyamine reactant can be selected from aliphatic polyamines, cycloaliphatic polyamines, aromatic polyamines and polyamines of mixed aliphatic, cycloaliphatic, and/or aromatic types, or mixtures thereof. In another contemplated embodiment, the polyamine reactant has at least two primary amino groups.

The polyamines which can be used are numerous and widely varied. Examples of such diamines include, but are not limited to: 1,2-ethanediamine, 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,2-benzenediamine, 1,3-benzenediamine, 1,4-benzenediamine, 1,5-naphthalenediamine, 1,8-naphthalenediamine, 2,4-toluenediamine, 2,5-toluenediamine, 3,3'-dimethyl-4,4'-biphenyldiamine, 4,4'-methylenebis[aniline], 4,4'-methylenebis[2-chloroaniline], 4,4'-oxybis[aniline], [1,1'-biphenyl]-4,4'-diamine, [1,1'-biphenyl]-3,3'-dichloro-4,4'-diamine, 6-phenyl-1,3,5-triazine-2,4-diamine, and piperazine.

The polyamine reactant can also be selected from one or more isomers of $C_1$–$C_3$ dialkyl toluenediamine, such as for example: 3,5-dimethyl-2,4-toluenediamine, 3,5-dimethyl-2,6-toluenediamine, 3,5-diethyl-2,4-toluenediamine, 3,5-diethyl-2,6-toluenediamine, 3,5-diisopropyl-2,4-toluenediamine, 3,5-diisopropyl-2,6-toluenediamine. In one contemplated embodiment, the polyamine reactant is an isomeric mixture containing mostly 3,5-diethyl-2,4-toluenediamine and 3,5-diethyl-2,6-toluenediamine.

In another contemplated embodiment of the present invention, the polyamine reactant can be selected from one or more diamines represented by Formula (I):

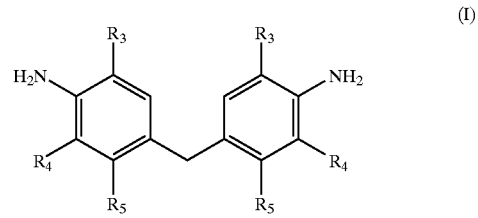

(I)

wherein $R_3$ and $R_4$ are each independently $C_1$–$C_3$ alkyl, and $R_5$ is selected from hydrogen and halogen, e.g., chlorine and bromine. The diamine represented by Formula (I) can be described generally as a 4,4'-methylene-bis(dialkylaniline). Specific examples of diamines represented by Formula (I) include, but are not limited to: 4,4'-methylenebis[2,6-dimethylaniline], 4,4'-methylenebis[2,6-diethylaniline], 4,4'-methylenebis[2-ethyl-6-methylaniline], 4,4'-methylenebis[2,6-diisopropylaniline], 4,4'-methylenebis[2-isopropyl-6-methylaniline], and 4,4'-methylenebis[2,6-diethyl-3-chloroaniline]. In one contemplated embodiment, the diamine represented by Formula (I) is 4,4'-methylenebis[2,6-diethyl-3-chloroaniline].

The polyamine can contain more than two amino groups. Examples include: diethylenetriamine, triethylenetetramine, tetraethylenepentamine, pentaethylenehexamine, 2-amino-1-ethylpiperazine, and N,N'-bis(3-aminopropylene)piperazine.

One or more polyols having at least three hydroxyl groups can optionally be used in forming the poly (urea-urethane). Such polyols are different from the polyols having at least 2 hydroxyl groups and include the triols, tetrols, or higher functional polyols. These polyols are numerous and widely varied. Examples include, but are not limited to: glycerol; trimethylolethane, e.g., 1,1,1-trimethylolethane; trimethylolpropane, e.g., 1,1,1-trimethylolpropane; benzenetriol, e.g., 1,2,3-benzenetriol, 1,2,4-benzenetriol, and 1,3,5-benzenetriol; cyclohexanetriol, e.g., 1,3,5-cyclohexanetriol; erythritol; pentaerythritol; 4,4'-(1,2-diethyl-1,2-dihydroxyethanediyl)bis[phenol]; sorbitol; mannitol; α-methylglucoside; sorbitan; dipentaerythritol; tripentaerythritol or a mixture thereof.

Further examples of the polyols having at least three hydroxyl groups include alkoxylated, e.g., ethoxylated, propoxylated, butoxylated and/or mixtures thereof, members of the aforementioned examples. The following polyols having at least three hydroxyl groups can be alkoxylated with from 1 to 50 alkoxy groups: glycerol, trimethylolethane, trimethylolpropane, benzenetriol, cyclohexanetriol, erythritol, pentaerythritol, 4,4'-(1,2-diethyl-1,2-dihydroxyethanediyl)bis[phenol], sorbitol, mannitol, α-methylglucoside, sorbitan, dipentaerythritol and tripentaerythritol. Such alkoxylated polyols can be used alone or in combination with the unalkoxylated polyols having at least three hydroxyl groups. The number of alkoxy groups can range from 1 to 50, e.g., from 2 to 20 or any number or partial number between 1 and 50. In one contemplated embodiment, the alkoxy group is ethoxy and ranges from 2.5 to 20. In another contemplated embodiment, the polyol having at least 3 hydroxyl groups is trimethylolpropane having 20 ethoxy units.

Generally, but not necessarily, the polyol having at least three hydroxyl groups has an average hydroxyl functionality of three hydroxyl groups per molecule. When a polyol having at least three hydroxyl groups is employed, it is typically used in amount less than the polyol having two hydroxl groups. For convenience and economy of space, the diol and the polyol having at least three hydroxyl groups will be collectively referred to herein as "total polyol". In most instances the ratio of the hydroxyl equivalents of polyol having at least three hydroxyl groups to the hydroxyl equivalents of diol present in the total polyol is in the range of from 0 to 0.25:1. Often the ratio is in the range of from 0 to 0.2:1, e.g., from 0.1:1 to 0.2:1 or 0.15:0.85.

Usually the average isocyanato functionality of the polyisocyanate having at least two isocyanato groups used in preparing the poly(urea-urethane) is in the range of from 2 to 3 isocyanato groups per molecule. In one contemplated embodiment, the polyisocyanate has an average isocyanato functionality of 2 isocyanato groups per molecule.

In most instances the average amino functionality of the polyamine having at least two amino groups used in preparing the poly(urea-urethane) is in the range of from 2 to 4 amino groups per molecule. In one contemplated embodiment, the polyamine has an average amino functionality of 2 amino groups per molecule.

In one non-limiting embodiment, aromatic polyamine that are known by those in the art to contribute minimally to yellowness can be used. Alternatively, the yellowness of aromatic polyamines with higher yellowness can be reduced by conventional means (e.g., distillation, carbon treatment, addition of reducing agents, and the like.) The polymeric substrates of this invention can be prepared by the one shot, quasi-prepolymer, or full prepolymer methods, all of which are well known in the art. In one contemplated embodiment, an isocyanate functional prepolymer can be prepared using quasi-prepolymer, or full prepolymer methods. In another contemplated embodiment, an isocyanate functional prepolymer can be prepared using the full prepolymer methods.

In one contemplated embodiment of the process for making the poly(urea-urethanes), a prepolymer is first made by reacting the polyisocyanate and the total polyol at an NCO/OH equivalent ratio in the range of from 1.3:1 to 4.5:1, e.g., 2.4:1 to 4:1 or in arrange between any of the aforementioned values. The reaction can conveniently be conducted at temperatures in the range of from 40° C. to 145° C. under a blanket of unreactive gas such as nitrogen or helium. Often the temperature is in the range of from 70° C. to 135° C. Frequently the temperature is in the range of from 90° C. to 130° C. Either or both of the reactants can be fed to the reaction mixture during the reaction, but it is more usual to simply admix the reactants and then heat the mixture to reaction temperature under a blanket of unreactive gas and maintain the reaction mixture at the reaction temperature for a period in the range of from 1 to 10 hours. In general, higher reaction temperatures favor shorter reaction periods.

Although no catalyst is required during prepolymer formation, the use of a catalyst is often desirable. When a catalyst is used, it is typically an organometallic catalyst, such as, for example, an organometallic tin, lead, iron, bismuth, or mercury compound. Organotin compounds such as dibutyltin dilaurate are preferred. Delayed-action catalysts can also be used. Other suitable catalysts are described in U.S. Pat. No. 5,646,230. When a catalyst is used, it is ordinarily used in an amount in the range of from 25 to 1000 parts per million of total reactants, by weight. Inasmuch as the polyisocyanate is used in excess, the product is an isocyanate-terminated prepolymer.

Small additional amounts of polyisocyanate may optionally be added to the prepolymer when it is desired to increase the isocyanato content.

In one contemplated embodiment of the process, the polyamine, photochromic compound(s) and the prepolymer are admixed to form a reaction mixture which is poured into a preheated mold and cured to form a photochromic poly (urea-urethane) article. In one instance, the mold is a lens mold and the poly(urea-urethane) article is a photochromic ophthalmic lens. In forming the reaction mixture, the polyamine and the prepolymer are admixed at an amine/NCO equivalent ratio in the range of from 0.75:1 to 1.2:1. Often the amine/NCO equivalent ratio is in the range of from 0.9:1 to 1.1:1. In many instances the amine/NCO equivalent ratio is in the range of from 0.9:1 to 1.05:1 and typically, the amine/NCO equivalent ratio is in the range of from 0.92:1 to 1:1.

Alternatively, the poly(urea-urethane) can be prepared by a quasi-prepolymer method of reacting the polyisocyanate with 0.3 to 0.8 equivalents of the total polyol to form a prepolymer, and then the remaining 0.2 to 0.7 equivalents of the total polyol are added with the diamine curing agent.

The temperature for curing can vary widely. The curing reaction can conveniently be conducted at temperatures in the range of from 40° C. to 135° C., e.g., from 45° C. to 110° C. or from 50° C. to 100° C. The curing period is usually in the range of from 3 minutes to 24 hours, depending upon the rate of reaction between the amino groups of the polyamine and the isocyanato groups of the prepolymer. Optionally, once the poly(urea-urethane) is solid enough to hold its shape, it can be removed from the mold and post-cured by heating it in an oven for several hours (usually overnight). The potlife of the reaction mixture (that is, the maximum time the formulator has to fill the mold with the reaction mixture after admixing the polyamine, photochromic compounds and the prepolymer) can be at least 20 seconds, and in one contemplated embodiment, at least 30 seconds.

Various conventional additives can be incorporated into the reaction mixture which is polymerized in accordance with the invention. Such additives can include light stabilizers, heat stabilizers, antioxidants, ultraviolet light absorbers, mold release agents, static (non-photochromic) dyes, pigments, and flexibilizing additives, e.g., alkoxylated phenol benzoates and poly(alkylene glycol) dibenzoates. Antiyellowing additives, e.g., 3-methyl-2-butenol, organo pyrocarbonates and triphenyl phosphite, can also be added to enhance resistance to yellowing. Such additives are typically present in amounts totaling less than 20% by weight. In one contemplated embodiment, conventional additives are included in an amount totaling less than 10% by weight, e.g., less than 5% by weight, based on the total weight of the combined polyamine and prepolymer. While such conventional additives can be added to either the prepolymer or the polyamine, they are typically incorporated into the polyamine.

The preparation of poly(urea-urethane) is described in U.S. Pat. Nos. 3,866,242; 5,811,506; 5,962,617; and 5,962,619.

One contemplated embodiment is the use of the combination of the photochromic coating compositions with optically clear poly(urea-urethane) polymerizates, i.e., materials suitable for optical applications, such as optical elements, e.g., plano and vision correcting ophthalmic lenses, windows, clear polymeric films, automotive transparencies, e.g., windshields, aircraft transparencies, plastic sheeting, etc.

Another contemplated embodiment is the use of the combination of the photochromic coating compositions with optical elements to produce photochromic optical articles. Such articles are prepared by sequentially applying to at least one surface of the optical element the photochromic coating composition and optionally appropriate protective coating(s), e.g., abrasion resistant coatings, and/or surface treatments, e.g., antireflective coatings and hydrophobic coatings. For example, the poly(urea-urethane) substrate can be coated/treated sequentially with a photochromic polymeric coating, an abrasion resistant coating and an antireflective surface as the outermost surface treatment. The resulting cured coating in one contemplated embodiment meets commercially acceptable "cosmetic" standards for optical coatings, and in another contemplated embodiment, the cured coating is substantially free of cosmetic defects.

The photochromic poly(urea-urethane) article prepared in accordance with the present invention is a non-elastomeric, optically clear solid (which exhibits low yellowness) having an adherent photochromic polymeric coating. The photochromic coated articles of the present invention may be further coated with a protective coating of silica, titania, and/or zirconia-based hard coating material. Alternatively, an organic hard coating material of the ultraviolet curable type can be applied so as to form a hard surface layer, whereby the surface hardness is enhanced. Application of such coatings can be by any of the methods used in coating technology such as, for example, spray coating, spin coating, spread coating, curtain coating, dip coating or roll-coating. Other coatings or surface treatments, e.g., a tintable coating, antireflective surface, etc., can also be applied to the photochromic articles of the present invention. An antireflective coating, e.g., a monolayer or multilayer of metal oxides, metal fluorides, or other such materials, can be deposited onto the photochromic articles, e.g., lenses, of the present invention through vacuum evaporation, sputtering, or some other method.

The present invention is more particularly described in the following examples, which are intended as illustrative only, since numerous modifications and variations therein will be apparent to those skilled in the art.

Composition A

The following materials were added in the order and manner described to a suitable reaction vessel equipped with an agitator, a reflux column, an addition funnel, nitrogen inlet, an internal temperature probe connected to an external electronic controller and a heating mantle:

| Material | Weight (grams) |
|---|---|
| Charge-1 | |
| SOLVESSO 100 solvent[1] | 120 |
| Xylene | 120 |
| Isobutanol | 48 |
| Charge-2 | |
| Hydroxypropyl acrylate | 448 |
| Butyl acrylate | 212.8 |
| Butyl methacrylate | 207.2 |
| Styrene | 22.4 |
| Acrylic acid | 22.4 |
| Methyl methacrylate | 5.6 |
| Tertiary dodecyl mercaptan | 11.2 |
| Charge-3 | |
| Xylene | 96 |
| SOLVESSO 100 solvent[1] | 72 |
| VAZO-67 initiator[2] | 56 |
| Charge-4 | |
| SOLVESSO 100 solvent[1] | 12 |
| VAZO-67 initiator[2] | 4.5 |
| Charge-5 | |
| SOLVESSO 100 solvent[1] | 12 |
| VAZO-67 initiator[2] | 4.5 |

[1] Aromatic solvent available from Exxon.
[2] 2,2'-azobis-(2-methylbutyronitrile) available from E.I. duPont de Nemours and Company.

Charge-1 was added to the reaction vessel; nitrogen was introduced into the vessel, and with the agitator running heat was applied to the reaction vessel to maintain a temperature at which reflux of the solvent occurred. After reaching the reflux temperature, Charges-2 and -3 were added separately to the reaction vessel in a continuous manner over a period of 2 hours. Subsequently, Charge-4 was added and the reaction mixture was held for 1 hour at the reflux temperature. Charge-5 was then added and the reaction mixture was held an additional 1.5 hours at the reflux temperature. The contents of the reaction vessel were then cooled and transferred to a suitable container. The resulting polymer solution had a calculated total solids content, based on total solution weight, of about 70.7 percent. The polymer had a weight average molecular weight, as measured by gel permeation chromatography using polystyrene as a standard, of about 9,000 and a hydroxyl value of about 170, based on polymer solids.

EXAMPLE 1

Part A

The following materials were added in the order and the manner described to a suitable reaction vessel equipped with an agitator, a thermometer, nitrogen inlet and heat/cooling capabilities. After addition of the materials, nitrogen was introduced into the vessel to provide a nitrogen blanket and the agitator was turned on. Heat was applied until the prepolymer reaction mixture reached a temperature of 250° F. (121° C.). Further heating was discontinued. The resulting exothermic reaction usually caused an increase in the temperature of the reaction mixture to about 280° F. (138° C.). If the temperature continued to rise above 280° F. (138° C.), cooling was applied. After the reaction temperature reached about 220° F. (104° C.), the prepolymer product was filtered through a 400 mesh filter. The resulting filtrate was cooled and transferred to a suitable container.

| Material | Number of Equivalents |
|---|---|
| PCLD (400 EW)[1] | 0.740 |
| PCLD (200 EW)[2] | 0.115 |
| PCLD (1000 EW)[3] | 0.025 |
| Trimethylolpropane | 0.120 |
| DESMODUR ® W[4] diisocyanate | 2.700 |

[1]Polycaprolactone diol having an equivalent weight of about 400.
[2]Polycaprolactone diol having an equivalent weight of about 200.
[3]Polycaprolactone diol having an equivalent weight of about 1000.
[4]Dicyclohexylmethane-4,4'-diisocyanate available from Bayer Corporation.

Part B

The following materials were added in the order and the manner described to a reaction injection molding (RIM) machine, such as the Max Mixer available from Max Machines:

| Material | Weight (grams) |
|---|---|
| Charge-1 | |
| Product of Part A | 50.00 |
| Charge-2 | |
| Diethyltoluenediamine | 12.50 |

Charge-1 was added to the container. Charge-2 was added and the contents were rapidly mixed in the Max Mixer. The exact amount of Charge 2 added to the container was based on the NCO number of the Product of Part A and determined by multiplying the NCO number by 1.0083. Typically the NCO number was within the range of 12 to 13 so the amount of Charge 2 varied by ±0.5 gram.

Part C

The product of Part B was poured into molds measuring 60–80 mm that were treated with an external mold release agent, preheated to 130° C. and placed in an oven at 130° C. for about 5 hours. Afterwards, the polymerizates were removed from the molds.

Part D

The following materials were added in the order and manner described to a suitable vessel equipped with an agitator:

| Material | Weight (grams) |
|---|---|
| Charge-1 | |
| Photochromic No. 1[5] | 2.691 |
| Photochromic No. 2[6] | 2.154 |
| Photochromic No. 3[7] | 0.538 |
| TINUVIN ® 144 UV stabilizer[8] | 1.309 |
| BAYSILONE ® paint additive PL[9] | 0.072 |
| Tin catalyst[10] | 0.494 |
| NMP[11] | 22.428 |
| Charge-2 | |
| Polyacrylic polyol of Composition A | 17.175 |
| QO POLYMEG 1000 diol[12] | 12.329 |
| Charge-3 | |
| VESTANAT ® B 1358 A blocked polyisocyanate[13] | 38.849 |
| Charge-4 | |
| SILQUEST ® A-187 silane[14] | 1.961 |

[5]A naphtho[1,2-b]pyran that exhibits a blue color when irradiated with ultraviolet light.
[6]A naphtho[1,2-b]pyran that exhibits a red-orange color when irradiated with ultraviolet light.
[7]A spironaphthoxazine which colors blue when irradiated with ultraviolet light.
[8]Hindered amine ultraviolet light stabilizer (CAS registry No. 41556-26-7) available from CIBA-GEIGY Corp.
[9]Phenyl methyl polysiloxane available from Bayer Corporation.
[10]Dibutyltin dilaurate available as DABCO T-12 catalyst or METACURE T-12 cataylst.
[11]N-methyl pyrrolidone solvent of 99 percent purity.
[12]Poly(oxytetramethylene)diol having a number average molecular weight of 1000 which is available from Great Lakes Chemical Corporation.
[13]A methyl ethyl ketoxime blocked, aliphatic polyisocyanate available from Huls America Inc.
[14]A γ-glycidoxypropyltrimethoxysilane available from OSi Specialties.

Charge-1 was added to the vessel, the agitator was turned on and the contents were mixed until the solids were dissolved. Charges 2, 3, and 4 were separately added and after each addition, the solution was mixed. The resulting solution was filtered through a 10 micron filter and degassed under vacuum for about 20 minutes.

EXAMPLE 2

The procedure of Example 1 was followed except that the following formulation was used in Part A to prepare the prepolymer.

| Material | Number of Equivalents |
|---|---|
| PCLD (400 EW) | 0.75 |
| PCLD (200 EW) | 0.10 |
| Trimethylolpropane | 0.15 |
| DESMODUR ® W diisocyanate | 2.70 |

EXAMPLE 3

The procedure of Example 1 was followed except that the following formulation was used in Part A to prepare the prepolymer.

| Material | Weight Percent (based on total monomer weight, unless indicated otherwise) |
|---|---|
| DESMODUR ® W diisocyanate | 61.2% |
| PEG (400)[15] | 35.9% |
| TMP (20EO)[16] | 2.9% |
| Tin Catalyst | 1.25 phm* |
| Tinuvin ® 328 UV absorber[17] | 0.5 phm |
| Irganox ® 1010 antioxidant[18] | 50 ppm** |

*parts per hundred parts of monomer
**parts per million

| Material | Weight Percent (based on total monomer weight, unless indicated otherwise) |
|---|---|

(15)Polyethylene gylcol having a number average molecular weight of 400.
(16)Trimethylolpropane having 20 ethoxy units.
(17)Ultraviolet light absorber available from CIBA-GEIGY Corp.
(18)Antioxidant available from CIBA-GEIGY Corp.

Comparative Example

A commercially available thermoplastic polycarbonate lens made by Sola USA, which was already coated with a protective coating was used as the substrate for the photochromic polyurethane coating.

EXAMPLE 4

Part A

Prior to application of the photochromic polymeric solution described in Part D of Example 1, some of the lenses of Example 1 and all of the lenses of Example 2 were treated with oxygen plasma in a PLASMAtech/PLASMAfinish microwave gas plasma system (unit). The following treatment conditions were used: power was set to 100 Watts; gas pressure was 42 pascals; a gas flowrate of 100 mL/minute was used; and the processing time was 60 seconds.

The lens of Example 3 and the Comparative Example lens were not pretreated prior to coating with a proprietary photochromic polyurethane formulation.

Half of the plasma treated lenses of Examples 1 and 2 were additionally coated with Hi-Gard® 1080 protective coating. The lenses having the substrate protective coating were designaged 1C and 2C in Table 1. After application of the protective coating, the lenses were cured in a convection oven at 60° C. for 20 minutes followed by further curing at 120° C. for 3 hours. The thickness of the dried coating was approximately 2 microns.

The photochromic polymeric solution described in Part D of Example 1 was applied via a spincoating method to the plasma-treated lenses of Examples 1 and 2. Approximately 800 milligrams of solution was dispensed onto each lens that was spinning at 2000 rpm, which resulted in a wet film weight of approximately 200 milligrams per lens. The coated lenses were initially exposed to infrared light for a time sufficient to reduce the sticky nature of the coated lenses and then were cured for 40 minutes in a convection oven maintained at 140° C. The final thickness of the dried coatings was approximately 20 microns.

The lenses of Examples 1 and 2 were additionally coated with an organosilane-containing protective coating and cured following the same conditions used to cure the Hi-Gard® 1080 protective coating.

The lens of Example 3 and the Comparative Example lens were coated in the same manner as the other lenses to result in a 20 micron cured coating. After the coating was applied, the lenses were not exposed to infrared light and were cured for 75 minutes in a convection oven maintained at 140° C.

Part B

The photochromic coated test samples of Examples 1 and 2 prepared in Part A were tested for photochromic response on an optical bench in the 72° F. (22° C.) Photochromic Performance Test described hereinafter Prior to testing on the optical bench, the photochromic coated lenses were exposed to 365 nm ultraviolet light for about 10 minutes at a distance of about 14 cm from the lamps to activate the photochromic compound. The UVA irradiance at the sample was measured with a Licor Model Li-1800 spectroradiometer and found to be 22.2 Watts per square meter. The samples were then placed under a halogen lamp for about 10 minutes at a distance of about 36 cm from the lamp to bleach, or inactivate, the photochromic compounds in the samples. The illuminance at the sample was measured with the Licor spectroradiometer and found to be 21.9 Klux. The test lenses were then kept in a dark environment for at least 1 hour prior to testing on the optical bench.

The bench was fitted with an Oriel Model #66011 300 Watt Xenon arc lamp, a remote controlled shutter, a Schott 3mm KG-2 band-pass filter, which removed short wavelength radiation, neutral density filter(s), condensing lens to a beam collimation, a quartz water cell for maintaining sample temperature, and a sample holder in which the test square to be tested was inserted.

Measurements were made on the optical bench with the power output adjusted to 6.2 Watts per square meter UVA and 18 Klux. Measurement of the power output was made using an International Light Research Radiometer (Model #: IL1700; Serial #: 1290) with a radiometer detector (Model #: SED 033; Serial #: 5886) or comparable equipment. The radiometer was placed in an optical rail carrier on the rail at the correct focal length and the light output was measured. Adjustments to the power output were made by increasing or decreasing the lamp wattage or by adding or removing neutral density filters in the light path.

The test lenses were exposed to UV irradiation using a Xenon arc lamp at 30° normal to the surface of the test lens. A monitoring, collimated beam of light from a tungsten/halogen lamp perpendicular to the test sample was passed through the sample and then directly through an integrating sphere attached to an Ocean Optics S2000 spectrophotometer. The control of the test conditions and acquisition of the data was handled by an in house visual basic program in conjunction with Ocean Optics OOI Base 32 software.

Response measurements, in terms of a change in optical density ($\Delta OD$) from the unactivated or bleached state to the activated or darkened state were determined by establishing the initial unactivated transmittance, opening the shutter from the Xenon lamp(s) and measuring the transmittance through activation at selected intervals of time. Change in optical density is determined according to the formula: $\Delta OD = \log(\% Tb/\% Ta)$, where % Tb is the percent transmittance in the bleached state, % Ta is the percent transmittance in the activated state and the logarithm is to the base 10.

The $\Delta OD$ was measured after the first thirty (30) seconds of UV exposure and then after fifteen (15) minutes with the optical bench maintained at a temperature of 72° F. (22° C.). The Bleach Rate (T ½) is the time interval in seconds for the $\Delta OD$ of the activated form of the photochromic compound in the coated test samples to reach one half the highest $\Delta OD$ at (72° F., 22° C.) after removal of the source of activating light. Results for the photochromic coated test samples for each Example are listed in Table 1.

TABLE 1

| Example No. | 72° F. ΔOD @ 30 (seconds) | 72° F. ΔOD @ 15 (minutes) | 72° F. (T 1/2) (seconds) |
|---|---|---|---|
| 1 | 0.25 | 0.54 | 84 |
| 1C | 0.24 | 0.53 | 85 |
| 2 | 0.25 | 0.54 | 85 |
| 2C | 0.24 | 0.53 | 87 |

The results of Table 1 show that the lenses of Examples 1 and 2 without the substrate protective coating demonstrated similar photochromic performance results to lenses 1C and 2C that were coated with Hi-Gard® 1080 protective coating. This indicates that comparable photochromic performance is obtained using the poly (urea-urethane) substrate of the present invention with or without having a protective coating applied prior to application of the photochromic polymeric coating.

Part C

The lenses of Example 1 that were not treated with oxygen plasma were cleaned with a tissue soaked with isopropyl alcohol. After drying, the lenses were coated with the photochromic polymeric solution of Part D of Example 1 via the spincoating and curing procedure described in Part A herein. The final thickness of the cured coating was approximately 20 microns. Adhesion of the coatings on the test lenses was measured using ASTM D-3359 Standard Test Method for Measuring Adhesion by Tape Test-Method B. Testing was performed prior to immersing the lenses in boiling deionized water and after 60 minutes of immersion in the boiling water. Immersion in boiling water simulated chemical attack. The adhesion test results revealed no loss of the coating before or after immersion in the boiling water for the lenses of Example 1 that were not treated with oxygen plasma.

Part D

The lens of Example 3 and the Comparative Example lens were subjected to the High Impact Resistant Substrate Adhesion Test. The test consists of immersing the coated lenses into boiling water for 4 hours and immediately thereafter immersing the lenses into a 3 liter volume of ice water. The lenses were left in the ice water overnight while the ice melted and returned to ambient temperature, i.e., about 70° F. (21° C.). Afterwards the lenses were removed and subjected to the tape pull test of ASTM D-3359 Standard Test Method for Measuring Adhesion by Tape Test-Method B. The results are listed in Table 2.

TABLE 2

| Sample Identification | Percent Adhesion |
|---|---|
| Example 3 | 100 |
| Comparative Example | 0 |

The results of Table 2 show that the substrate of Example 3 provided superior adhesion of the photochromic polyurethane coating when compared to the Comparative Example, a commercially available high impact lens with a protective coating, to which the same photochromic polyurethane coating was applied.

Although the present invention has been described with reference to the specific details of particular embodiments thereof, it is not intended that such details be regarded as limitations upon the scope of the invention except as and to the extent that they are included in the accompanying claims.

We claim:

1. An article comprising a non-elastomeric poly(urea-urethane) substrate comprising free isocyanato surface groups and at least a partial coating of a photochromic polymeric coating on at least one surface of said substrate.

2. The article of claim 1 wherein the substrate further comprises free amino surface groups.

3. The article of claim 1 wherein the substrate is prepared from a composition comprising the reaction product of:

(a) at least one polyol having at least two hydroxyl groups;

(b) at least one polyisocyanate having at least two isocyanato groups; and (c) at least one polyamine having at least two amino groups;

wherein the number of isocyanato groups of the polyisocyanate reactants is greater than the number of hydroxyl groups of the polyol reactants.

4. The article of claim 3 wherein component (a) of the composition further comprises at least one polyol having at least three hydroxyl groups that is different from the polyol having at least two hydroxyl groups.

5. The article of claim 4 wherein the polyol having at least three hydroxyl groups further comprises from 1 to 50 alkoxy groups, said alkoxy groups being ethoxy, propoxy, butoxy or a mixture thereof.

6. The article of claim 5 wherein the polyol having at least three hydroxyl groups is chosen from at least one of glycerol, trimethylolethane, trimethylolpropane, benzenetriol, cyclohexanetriol, erythritol, pentaerythritol, 4,4'-(1,2-diethyl-1,2-dihydroxyethanediyl)bis[phenol], sorbitol, mannitol, α-methylglucoside, sorbitan, dipentaerythritol or tripentaerythritol.

7. The article of claim 6 wherein the polyol is trimethylolpropane, trimethylolpropane having 20 ethoxy groups or a mixture thereof.

8. The article of claim 3 wherein the polyol having at least two hydroxyl groups is an aliphatic, alicyclic, aromatic, aliphatic-alicyclic, aliphatic-aromatic, alicyclic-aromatic, aliphatic-alicyclic-aromatic polyol or mixtures thereof.

9. The article of claim 8 wherein the polyol is an ester diol, polyester diol, polyether diol, a diol having a formula molecular weight less than 500 grams per mole or a mixture thereof.

10. The article of claim 9 wherein the polyol is poly (caprolactone diol), polyethylene glycol or a mixture thereof.

11. The article of claim 3 wherein the polyisocyanate is an aliphatic isocyanate, alicyclic isocyanate, aromatic isocyanate or a mixture thereof.

12. The article of claim 11 wherein the polyisocyanate is bis(4-isocyanatocyclohexyl)methane.

13. The article of claim 3 wherein the polyamine is an aliphatic polyamine, alicyclic polyamine, aromatic polyamine or a mixture thereof.

14. The article of claim 13 wherein the polyamine is chosen from:

(a) $C_1$–$C_3$ dialkyl toluenediamine;

(b) diamines represented by the following formula:

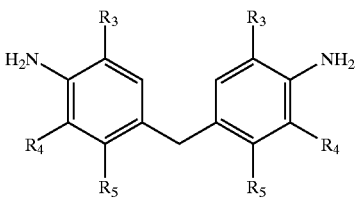

wherein $R_3$ and $R_4$ are each independently $C_1$–$C_3$ alkyl, and $R_5$ is selected from hydrogen or halogen; or (c) a mixture thereof.

15. The article of claim 13 wherein the polyamine is 3,5-diethyl-2,4-toluenediamine, 3,5-diethyl-2,6-toluenediamine or a mixture thereof.

16. The article of claim 1 wherein the substrate is prepared from a composition comprising the reaction product of:
(a) a isocyanate-functional prepolymer; and
(b) at least one polyamine having at least two amino groups.

17. The article of claim 1 wherein the photochromic polymeric coating comprises a film-forming polymer and a photochromic amount of at least one photochromic compound.

18. The article of claim 17 wherein the film-forming polymer is chosen from polyurethane, aminoplast resin, (meth)acrylate, silane, polyanhydride, polyacrylamide or epoxy resin.

19. The article of claim 17 wherein the at least one photochromic compound has at least one activated absorption maxima within the range of 400 to 700 nanometers.

20. The article of claim 19 wherein the at least one photochromic compound is chromenes, spiropyrans, oxazines, organo-metal dithiozonates, fulgides, fulgimides or a mixture thereof.

21. The article of claim 1 wherein the at least partial coating of a photochromic polymeric coating demonstrates substantially no loss of adhesion from the substrate when subjected to ASTM D-3359 Standard Test Method for Measuring Adhesion by Tape Test-Method B.

22. The article of claim 21 wherein the photochromic polymeric coating is adapted to directly adhere to the substrate without an intermediate layer, coating or surface treatment to improve adhesion.

23. The article of claim 21 wherein the substrate is adapted to adhere to the photochromic polymeric coating.

24. The article of claim 1 wherein the article comprising the at least partial coating of a photochromic polymeric coating further comprises an at least partially abrasion resistant coating on at least one surface of said substrate.

25. The article of claim 1 wherein the article comprising the at least partial coating of a photochromic polymeric coating further comprises an at least partially abrasion resistant coating and an at least partially antireflective coating on at least one surface of said substrate.

26. The article of claim 1 wherein the article comprising the at least partial coating of a photochromic polymeric coating demonstrates substantially no loss of adhesion from the substrate when subjected to the High Impact Resistant Substrate Adhesion Test.

27. The article of claim 1 wherein said non-elastomeric poly(urea-urethane) substrate is an optical element.

28. The article of claim 27 wherein said optical element is a lens.

29. An article comprising a non-elastomeric poly(urea-urethane) substrate and at least a partial coating of a photochromic polymeric coating comprising a film forming polymer chosen from polyurethane, aminoplast resin, silane, polyanhydride, polyacrylamide or epoxy resin and a photochromic amount of at least one photochromic compound on at least one surface of said substrate, the substrate being prepared from a composition comprising the reaction product of:

(a) a polyurethane prepolymer comprising the reaction product of:
(i) at least one polyol having at least two hydroxyl groups; and
(ii) at least one polyisocyanate having at least two isocyanato groups; wherein the number of isocyanato groups of the polyisocyanate reactants is greater than the number of hydroxyl groups of the polyol reactants; and (b) at least one polyamine having at least two amino groups;

the photochromic polymeric coating being applied directly to the substrate without an intermediate layer, coating or surface treatment to improve adhesion; and said coating demonstrating substantially no loss of adhesion from the substrate when subjected to ASTM D-3359 Standard Test Method for Measuring Adhesion by Tape Test-Method B.

30. The article of claim 29 wherein component (a)(i) of the composition further comprises at least one polyol having at least three hydroxyl groups.

31. The article of claim 29 wherein the photochromic polymeric coating is a photochromic polyurethane coating.

32. An article comprising a non-elastomeric poly(urea-urethane) substrate and at least a partial coating of a photochromic polyurethane coating on at least one surface of said substrate, said substrate being prepared from a composition comprising the reaction product of:

(a) a polyurethane prepolymer comprising the reaction product of:
(i) at least one polyol having at least two hydroxyl groups;
(ii) at least one polyol having at least three hydroxyl groups that is different from polyol (a) (i); and
(ii) at least one polyisocyanate having at least two isocyanato groups; wherein the number of isocyanato groups of the polyisocyanate reactants is greater than the number of hydroxyl groups of the polyol reactants; and (b) at least one polyamine having at least two amino groups;

the photochromic polyurethane coating being applied directly to the substrate without an intermediate layer, coating or surface treatment to improve adhesion; and said coating demonstrating substantially no loss of adhesion from the substrate when subjected to the High Impact Resistant Substrate Adhesion Test.

* * * * *